C. J. MANNING.
PRESSURE GAGE.
APPLICATION FILED OCT. 26, 1916.
1,222,315.
Patented Apr. 10, 1917.
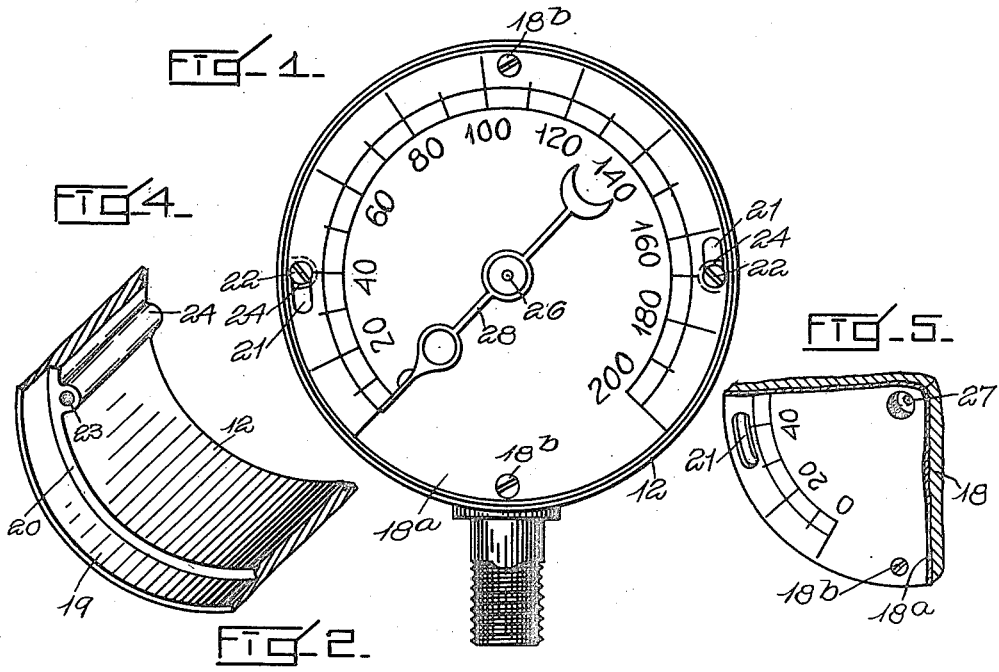
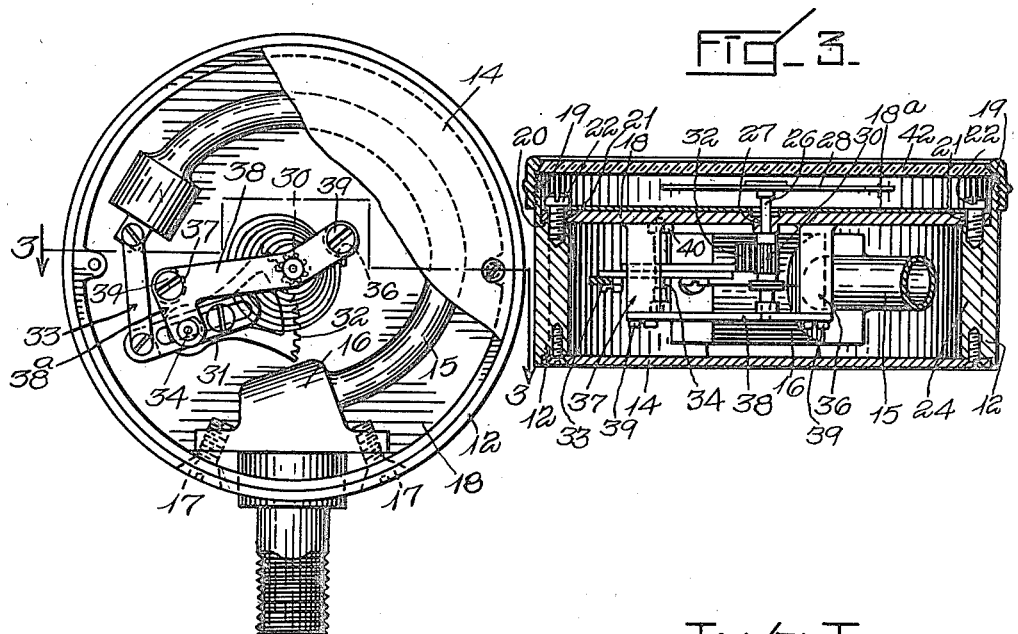
INVENTOR=
COLEMAN J. MANNING
by  
ATTORNEYS

UNITED STATES PATENT OFFICE.

COLEMAN J. MANNING, OF MEDFORD, MASSACHUSETTS, ASSIGNOR TO AMERICAN STEAM GAUGE & VALVE MANUFACTURING COMPANY, OF BOSTON, MASSACHUSETTS, A CORPORATION OF MASSACHUSETTS.

PRESSURE-GAGE.

1,222,315.  Specification of Letters Patent.  Patented Apr. 10, 1917.

Application filed October 26, 1916. Serial No. 127,799.

*To all whom it may concern:*

Be it known that I, COLEMAN J. MANNING, a citizen of the United States, residing at Medford, in the county of Middlesex and State of Massachusetts, have invented new and useful Improvements in Pressure-Gages, of which the following is a specification.

This invention relates to a pressure gage, comprising a casing having a dial, a pointer-carrying shaft the pointer of which coöperates with the dial in registering variations of pressure, and pressure-controlled mechanism within the casing actuated by variations of pressure in a conduit or receptacle with which the gage is connected to rotate the shaft either forward or backward. Said pressure-controlled mechanism usually includes a Bourdon tube and connections between the free end of said tube and the pointer-carrying shaft.

A Bourdon tube is liable to have its form changed by various causes, so that, when at rest, its form deviates from the standard form it was intended to have. Correction of the aberrations of the pointer caused by these deviations has heretofore been accomplished with more or less difficulty and inconvenience because the dial has heretofore been a rigid and non-adjustable portion of the casing, so that it has been necessary to open the casing and correct the aberration by making changes in the connections between the Bourdon tube and the pointer shaft.

My invention has for its object to enable aberrations of the pointer, due to imperfections of form of the Bourdon tube, to be more quickly and conveniently corrected than heretofore. I accomplish this object by making the dial rotatively adjustable relatively to the marginal wall or body of the casing instead of rigidly attaching it to said wall, and by providing the dial with means acting, when the dial is being adjusted, to change the position of the pointer.

Of the accompanying drawings forming a part of this specification,—

Figure 1 represents a front elevation of a pressure gage embodying my invention.

Fig. 2 represents a rear elevation of the same, a part of the back cover of the casing being broken away.

Fig. 3 represents a section on the line 3—3 of Fig. 2.

Fig. 4 represents a perspective view of a fragment of the annular casing wall or curb hereinafter referred to.

Fig. 5 represents a perspective view of a fragment of the dial plate.

The same reference characters indicate the same parts in all of the figures.

The fixed portion or body of the casing of my improved pressure gage is an annular wall or curb 12, which may be provided with a removable back plate or cover 14 adapted to exclude dirt, etc., from the inclosed pressure-controlled mechanism. Said mechanism, as here shown, includes a Bourdon tube 15 formed on a block 16 attached by screws 17 to the curb. The front end of the curb 12 is closed by a discoidal dial plate 18 which is rotatively adjustable to a limited extent relatively to the curb, the preferred connection between the dial plate and curb being as follows: The outer end of the curb is internally enlarged to form an annular seat 19, and an annular shoulder 20, Fig. 4. The perimeter of the dial plate has a sliding fit on the seat 19, and the margin of the inner side of the dial plate has a sliding fit on the shoulder 20. Segmental slots 21 are formed in the marginal portions of the dial plate, these slots receiving set screws 22 engaged with tapped orifices 23 preferably formed in bosses 24 on the inner surface of the curb. Said slots and screws permit a limited rotative adjustment of the dial plate, the screws when tightened securing the dial plate at any desired adjustment.

The usual indicia on the outer face of the dial plate may be formed either directly on the body of the plate or on a thin veneer plate 18$^a$ attached by screws 18$^b$ or otherwise to the said body.

26 represents a shaft which extends through an orifice or bearing 27 in the center or axis of rotation of the dial plate and carries a pointer 28 adapted to coöperate with the dial, the said shaft and dial plate being coaxially mounted. The shaft 26 is provided with a pinion 30 forming a member of the mechanism connecting the Bourdon tube with the pointer shaft, said mechanism as here shown also including a two-armed lever 31, having on one arm an arcuate rack 32 meshing with the pinion 30. The other arm of said lever is connected by a link 33 with the free end of the Bourdon tube.

The lever 31 is adapted to oscillate on a fulcrum stud 34 which is supported by and is so connected with the dial plate 18 that a rotative adjustment of said plate changes the position of the fulcrum stud laterally in the direction required to cause the rack 32 to impart a partial rotation to the pinion 30 and therefore to the pointer shaft and pointer. The movement thus imparted to the pointer is of much greater amplitude than that imparted to the dial plate in adjusting it within the limits permitted, and is sufficient to correct any aberrations of the pointer due to imperfections of form of the Bourdon tube. Said tube and the described mechanism connecting its free end with the pointer shaft are supposed to cause the pointer to stand at zero when the gage is at rest. It often happens, however, that the curvature of the tube is altered from the predetermined curvature by internal pressure "setting" the tube or causing a permanent change of its curvature, and by other causes, so that, when the gage is at rest, the pointer does not stand at zero. Heretofore, the correction of such aberrations of the pointer has required a change in the operative length of the link 33, this being usually effected by removing the link and substituting another therefor. I have found that the desired result may be much more quickly and easily accomplished by rotatively adjusting the dial plate without using different links 33 interchangeably, a link 33 of standard length and having its holes at a standard distance apart being sufficient.

The preferred connection between the fulcrum stud 34 and the dial plate 18 is embodied in posts 36 and 37 cast or rigidly attached to the dial plate and projecting from the back thereof, and a bar 38 attached by screws 39 to said posts and provided with an arm 38ª having a bearing in which one end of the fulcrum stud 34 is journaled, the dial plate being provided with a bearing 40, Fig. 3, in which the inner end of the fulcrum stud is journaled.

The dial and pointer may be covered by the usual face glass 42 confined against the outer end of the curb 12 by a ring 43 having a screw-thread engagement with the curb.

It will be seen that the rotative adjustments of the dial enable the markings or indicia thereon to be adjusted relatively to the pointer to correct aberrations of the pointer which may occur at any part of its path of movement over the dial.

I claim:

1. A pressure gage comprising, in combination, an annular casing wall or curb, a dial plate rotatively adjustable to a limited extent on said curb, a pointer-carrying shaft extending through the center or axis of movement of the dial plate, and pressure-controlled shaft-rotating mechanism including a member carried by and adjustable with the dial plate and acting when the dial plate is rotatively adjusted to cause a rotative change in the position of the shaft and pointer and thereby correct aberrations of the pointer, means being provided for securing the dial plate to the curb in any position to which it may be adjusted.

2. A pressure gage comprising, in combination, an annular casing wall or curb having an internally enlarged end portion forming an annular internal shoulder near one end of the curb, a dial plate mounted in said enlargement in sliding contact with said shoulder, said dial plate being provided with slots and the curb with set screws adapted to secure the dial plate to the curb in various adjusted positions, a pointer-carrying shaft extending through the center or axis of movement of the dial plate, and pressure-controlled shaft-rotating mechanism including a member carried by and adjustable with the dial plate and acting when the dial plate is rotatively adjusted to cause a rotative change in the position of the shaft and pointer and thereby correct aberrations of the pointer.

3. In a pressure gage, in combination, an annular casing wall or curb, a dial plate rotatively adjustable to a limited extent relatively to said curb, a pointer-carrying shaft extending through the center or axis of movement of the dial, a Bourdon tube attached to the curb, a fulcrum stud located at one side of the axis of the dial plate, fulcrum stud-supporting means attached to the dial plate, a two-armed lever mounted to oscillate on said fulcrum stud, one arm of said lever having an arcuate rack meshing with a pinion on the pointer-carrying shaft, and a link connecting the other arm of said lever with the free end of the Bourdon tube, the lever being movable on said fulcrum stud by the Bourdon tube to rotate the shaft, and also movable by lateral adjustments of the fulcrum stud caused by rotative adjustments of the dial plate to correct aberrations of the pointer due to deviations of the Bourdon tube from the standard form, means being provided for securing the dial plate to the curb at various rotative adjustments.

4. In a pressure gage, in combination, an annular casing wall or curb having an internally enlarged end portion forming an annular internal shoulder near one end of the curb, a dial plate rotatably mounted in said enlargement in sliding contact with said shoulder, said dial plate being provided with slots, and the curb with set screws adapted to secure the dial plate to the curb in various adjusted positions, a pointer-carrying shaft extending through the center or axis of movement of the dial, a Bourdon tube attached to the curb, a fulcrum stud located at one side of the axis of the dial plate, fulcrum stud-supporting means attached to the dial plate, a two-armed lever mounted to oscillate on said fulcrum stud, one arm of said lever having an arcuate rack meshing with a pinion on the pointer-carrying shaft, and a link connecting the other arm of said lever with the free end of the Bourdon tube.

In testimony whereof I have affixed my signature.

COLEMAN J. MANNING.